(12) United States Patent
Falk

(10) Patent No.: US 9,277,404 B2
(45) Date of Patent: Mar. 1, 2016

(54) METHOD FOR REGISTERING A WIRELESS COMMUNICATION DEVICE AT A BASE DEVICE AND CORRESPONDING SYSTEM

(75) Inventor: Rainer Falk, Poing (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 111 days.

(21) Appl. No.: 13/811,462

(22) PCT Filed: Jun. 22, 2011

(86) PCT No.: PCT/EP2011/060489
§ 371 (c)(1),
(2), (4) Date: Jan. 22, 2013

(87) PCT Pub. No.: WO2012/010381
PCT Pub. Date: Jan. 26, 2012

(65) Prior Publication Data
US 2013/0122869 A1 May 16, 2013

(30) Foreign Application Priority Data

Jul. 22, 2010 (DE) .......................... 10 2010 031 931

(51) Int. Cl.
*H04M 1/68* (2006.01)
*H04W 12/06* (2009.01)
(Continued)

(52) U.S. Cl.
CPC ........... *H04W 12/06* (2013.01); *H04L 63/0492* (2013.01); *H04L 63/0853* (2013.01); *H04W 52/50* (2013.01); *H04W 60/00* (2013.01); *H04W 88/08* (2013.01)

(58) Field of Classification Search
CPC ..... H04W 12/08; H04W 12/04; H04W 12/06; H04W 12/02; H04W 76/02; H04W 4/008; H04W 4/12; H04W 12/00; H04L 63/083; H04L 63/0892; H04L 63/0471
USPC .................................................. 455/410–411
See application file for complete search history.

(56) References Cited

U.S. PATENT DOCUMENTS 7,565,107 B2 7/2009 Komatsuzaki et al. ...... 455/41.1
8,213,355 B2 7/2012 Matsuo .......................... 370/328
(Continued)

FOREIGN PATENT DOCUMENTS

CN 101198181 A 6/2008 .............. H04L 12/28
CN 201270534 Y 7/2009 .............. H04L 29/08
(Continued)

OTHER PUBLICATIONS

Finzenzeller, "RFID Handbook," Grundlagen und Praktische Anwendungen Induktiver Funkanlagen, Transponder und Kontakloser Chipkarten, 3. Auflage, book, pp. 48-50, 9 pages (w/ Engl. Translation), 2002.
(Continued)

*Primary Examiner* — Khai M Nguyen
*Assistant Examiner* — Dung Lam
(74) *Attorney, Agent, or Firm* — Slayden Grubert Beard PLLC

(57) ABSTRACT

A method for registering a wireless communication device at a base device may include the steps of: transmitting from a wireless authentication device a piece of authentication information; receiving at the wireless communication device the piece of authentication information, e.g., using in-band communication; transferring the piece of authentication information from the wireless communication device to the base device; analyzing at the base device the transferred piece of authentication information; and incorporating the wireless communication device into a network depending on the result of the analysis. A corresponding system and to a use thereof are also provided.

19 Claims, 3 Drawing Sheets

(51) Int. Cl.
*H04L 29/06* (2006.01)
*H04W 52/50* (2009.01)
*H04W 60/00* (2009.01)
*H04W 88/08* (2009.01)

(56) References Cited

U.S. PATENT DOCUMENTS

| | | | |
|---|---|---|---|
| 8,561,168 B2 | 10/2013 | Ishidoshiro | 726/13 |
| 2004/0203600 A1* | 10/2004 | McCorkle et al. | 455/411 |
| 2005/0105734 A1* | 5/2005 | Buer et al. | 380/270 |
| 2005/0117752 A1 | 6/2005 | Ilma et al. | 380/270 |
| 2006/0282885 A1* | 12/2006 | Combs et al. | 726/5 |
| 2007/0186105 A1 | 8/2007 | Bailey et al. | 713/168 |
| 2008/0214167 A1* | 9/2008 | Natsuno et al. | 455/414.3 |
| 2013/0122869 A1 | 5/2013 | Falk | 455/411 |

FOREIGN PATENT DOCUMENTS

| | | | |
|---|---|---|---|
| CN | 101616487 A | 12/2009 | |
| EP | 1536306 A1 | 6/2005 | G06F 21/00 |
| JP | 2004007351 A | 1/2004 | G06F 13/00 |
| JP | 2005142907 A | 6/2005 | H04L 12/28 |
| JP | 2005303459 A | 10/2005 | H04L 12/28 |
| JP | 2007150984 A | 6/2007 | H04B 7/26 |
| JP | 2008263335 A | 10/2008 | H04B 7/26 |
| WO | 2012/010381 A1 | 1/2012 | H04L 29/06 |

OTHER PUBLICATIONS

International Search Report and Written Opinion, Application No. PCT/EP2011/060489, 13 pages, Sep. 6, 2011.
Chinese Office Action, Application No. 201180035860.3, 14 pages, Aug. 19, 2014.
Chinese Office Action, Application No. 201180035860.3, 5 pages, Aug. 19, 2015.

* cited by examiner

500 # METHOD FOR REGISTERING A WIRELESS COMMUNICATION DEVICE AT A BASE DEVICE AND CORRESPONDING SYSTEM

CROSS-REFERENCE TO RELATED APPLICATIONS

This application is a U.S. National Stage Application of International Application No. PCT/EP2011/060489 filed Jun. 22, 2011, which designates the United States of America, and claims priority to DE Patent Application No. 10 2010 031 931.7 filed Jul. 22, 2010 The contents of which are hereby incorporated by reference in their entirety.

TECHNICAL FIELD

The disclosure relates to a method for registering a wireless communication device and also a corresponding system.

BACKGROUND

Nowadays control units, sensors, actuators are increasingly connected to one another, or networked, wirelessly in order to ensure the greatest possible flexibility. In this situation it is also simpler to carry out maintenance on the units or sensors because for example in the case of a malfunction there is no need to open any cable ducts etc. but merely the unit directly. Open protocols such as IEEE 802.11 WLAN, IEEE 802.15.4, Bluetooth, ZigBee or also Wireless HART are normally used in order to connect the aforementioned control units, sensors, etc. In order where possible to avoid any manipulation of the sensors or instructions to the control units during the wireless connection the communication from the control unit or sensor is cryptographically encoded by the corresponding point interface, for example through a WLAN connection using TKIP or CCMP, or in the case of 802.15.4 using AES-CCM. In order to connect a control unit, a sensor or similar to a wireless station and to establish an encrypted connection the control unit, the sensor or the wireless communication device in general must be configured such that the appropriate encryption is used, in other words for example that a cryptographic key is set up. The setup of such a key is also referred to as bootstrapping or pairing.

It is known from US 2006/282885 that an administrator unit of a wireless unit to be configured wirelessly provides a proof of authority. The wireless unit is configured by the administrator unit using the proof of authority provided by the administrator unit.

It is furthermore known to conduct an in-band communication during a weakly protected phase. For this purpose, the corresponding wireless communication unit to be set up does however require special modified transfer methods. Finally, it is known to conduct a pairing secured by an out-of-band channel, such as for example human interaction (in other words entering or checking a PIN, etc.).

Disadvantageous in this case is the fact that the aforementioned methods require a high degree of effort and are complicated in design, particularly when used in the industrial sector because a large number of wireless communication devices are set up there. In this situation it is at the same time necessary that the pairing takes place in protected or secured fashion because the security configuration parameters are set up in the process.

SUMMARY

One embodiment provides a method for registering a wireless communication device at a base device, comprising the steps: (a) transmission of a piece of authentication information by a wireless authentication device, (b) receipt of the separate piece of authentication information by the wireless communication device, in particular by means of in-band communication, (c) transfer of the received piece of authentication information by the wireless communication device to the base device, (d) analysis of the transmitted piece of authentication information by the base device, and (e) inclusion of the wireless communication device in a network depending on the result of the analysis.

In a further embodiment, the transmission of a piece of authentication information takes place using a reduced transmitting power and/or directionally, which means that the piece of authentication information can be received only in spatially restricted fashion.

In a further embodiment, prior to transmission of the piece of authentication information monitoring and/or evaluation of signals takes place, in particular communication signals, from the wireless communication device and/or from further wireless communication devices located within wireless range of the authentication device.

In a further embodiment, the monitored and/or evaluated signals of the wireless communication device are coded into the piece of authentication information, wherein in particular the coded monitored communication is evaluated by the base device.

In a further embodiment, prior to transmission of the piece of authentication information an analysis is performed of at least one parameter of a wireless environment.

In a further embodiment, prior to transmission of the piece of authentication information a localization of the wireless authentication device takes place.

Another embodiment provides a system for registering a wireless communication device, in particular suitable for executing any of the methods disclosed above, the system comprising: (a) a wireless authentication device for transmitting a piece of authentication information, (b) a wireless communication device for receiving the transmitted piece of authentication information, in particular by means of in-band communication, and for sending the piece of authentication information to a base device in order to register the wireless communication device, and (c) wherein the base device includes the wireless communication device in a network depending on a result of the analysis of the piece of authentication information.

In a further embodiment, the wireless authentication device has observation means for observing a wireless environment and/or a localization of the wireless authentication device.

In a further embodiment, the wireless authentication device has means for adjusting a transmitting power.

In some embodiments, such system may be used for registering a wireless communication device.

BRIEF DESCRIPTION OF THE DRAWINGS

Exemplary embodiments will be explained in more detail below on the basis of the schematic drawings, wherein.

DETAILED DESCRIPTION

Figure 1:
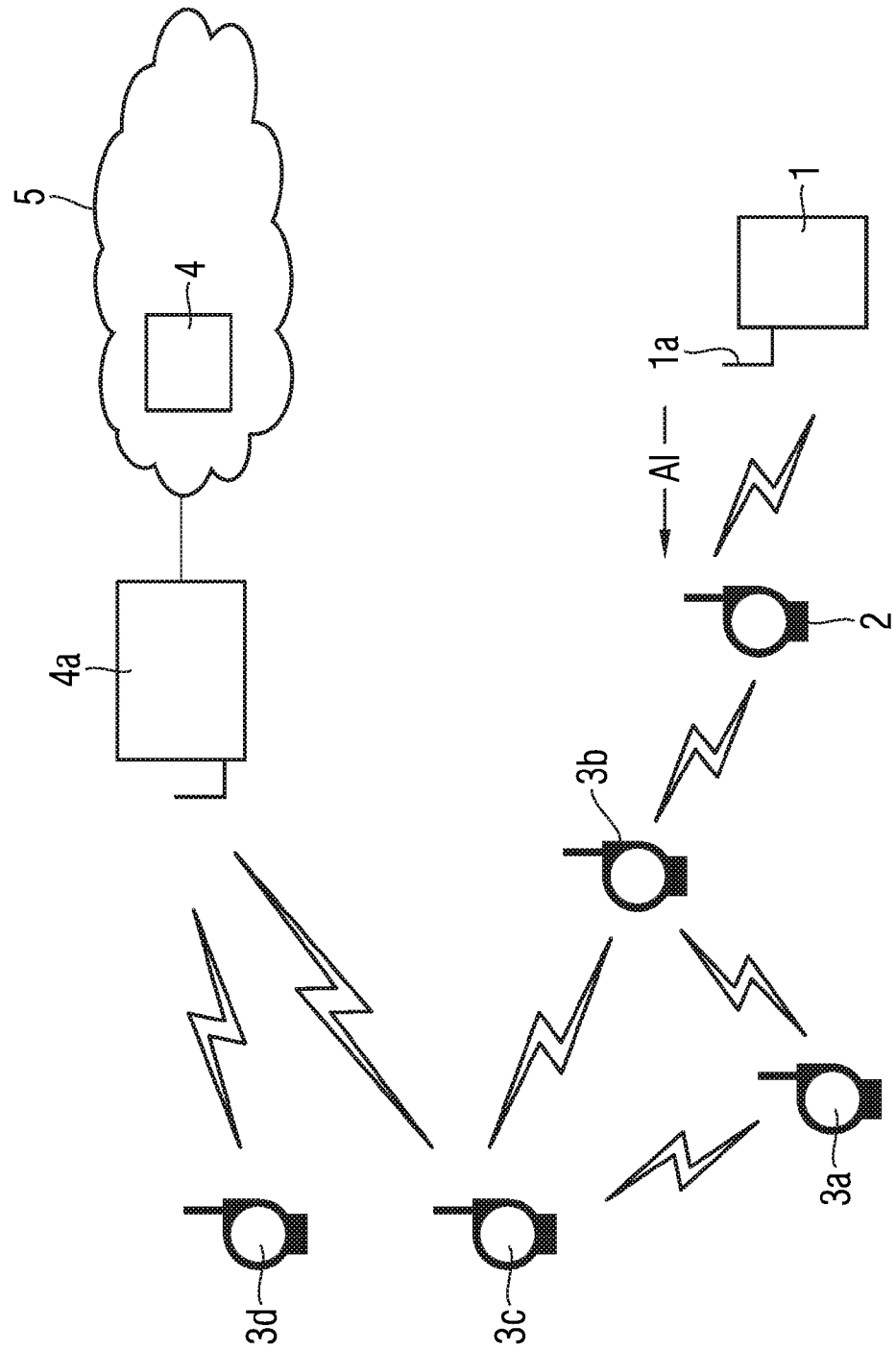
FIG. 1 shows a method or a system for registering a wireless communication device in a first example embodiment.

Embodiments of the present disclosure provide a method and a system for registering a wireless communication device at a base device, wherein the operation of pairing can be carried out more simply and with a low degree of effort for a plurality of wireless units to be registered and at the same time the pairing operation takes place in protected fashion. Some embodiments provide an advantage in that no additional interaction is necessary for registering the wireless communication device at the base device, only an appropriate authentication device needs to be carried, for example by a technician etc., in order to prepare the wireless communication device for pairing with the base device.

Advantageously, the transmission of a piece of authentication information takes place using a reduced transmitting power and/or directionally, which means that the piece of authentication information can be received only in spatially restricted fashion. The advantage here is that the security of the registration of the wireless communication device is thereby further improved because the piece of authentication information can only be received in a certain zone which is spatially restricted on account of the limited range and/or the directional emission. It is thus rendered more difficult for a potential attacker to tap into or eavesdrop on transferred pieces of authentication information.

Advantageously, prior to transmission of the piece of authentication information, monitoring and/or evaluation of signals takes place, in particular communication signals, from the wireless communication device and/or from further wireless communication devices located within wireless range of the authentication device. The advantage achieved in this case is the fact that thereby on the one hand the security of the registration of the wireless communication device overall is improved and at the same time the reliability can be increased. If for example a monitoring of radio signals in the frequency range of the wireless communication device is conducted and the analysis yields the result that unusual radio signals and/or communication signals are being sent and/or received here by the wireless communication device, a corresponding piece of information is indicated to a user of the wireless authentication device which means that the transmission of the piece of authentication information takes place only when the reason for the unusual radio and/or communication signals has been found so as to be able to exclude any manipulation of the wireless communication device or tapping into the communication of the wireless communication device using the wireless authentication device.

Advantageously, the monitored and/or evaluated signals of the wireless communication device are coded into the piece of authentication information, wherein in particular the coded monitored and/or evaluated signals are evaluated by the base device. The advantage here is that the security is thereby further improved because the wireless communication device has at its disposal a piece of information about certain radio and/or signal properties, which means that any manipulation of the wireless communication device can be detected. If the information from the monitored and/or evaluated signals is coded into the piece of authentication information evaluated by the base device, this prevents a manipulated wireless communication device from itself sending a deliberately incorrect checking result to the base device and a registration of the wireless communication device at the base device thus takes place in spite of the manipulation. The security is further enhanced by this means.

Expediently, prior to transmission of the piece of authentication information, an analysis is performed of at least one parameter of a wireless environment. As a result of monitoring at least one parameter of the wireless environment, it is for example possible to simply recognize further wireless units or interference signals in the environment, such that given the presence of interference signals or other units in the environment where appropriate a transmission of the piece of authentication information can be inhibited in order to avoid manipulations or an incorrect transfer of the piece of authentication information from the wireless authentication device to the wireless communication device.

In order to ensure that the wireless authentication device is not removed for manipulative purposes for example from a building or a predefined environment it is advantageous that a localization of the wireless authentication device takes place prior to transmission of the piece of authentication information.

FIG. 1 shows a method or a system for registering a wireless communication device in a first example embodiment.

In FIG. 1 a reference character 1 denotes a wireless authentication device 1 which has a wireless interface 1a. The wireless authentication device 1 transfers a piece of authentication information AI over the wireless interface 1a to a wireless communication device 2 which is to be registered at a base device 4. Already registered at the base device 4 are further wireless communication devices in the form of sensor nodes 3a, 3b, 3c, 3d which are connected to one another wirelessly for the transfer of sensor data and where applicable also directly to the wireless interface 4a of the base device 4. The base device 4 is in turn connected to a network 5 and allows the sensor nodes 3a, 3b, 3c, 3d to access the network 5 after successful login or authentication (Network Join) at the base device 4. Only a sensor node 3a, 3b, 3c, 3d registered at the base device 4 can successfully log in at the base device 4. To this end the base device 4 accesses stored information concerning registered sensor nodes 3a, 3b, 3c, 3d. After the piece of authentication information AI has been transferred from the wireless authentication device 1 to the wireless communication device 2, the latter transmits the received pieces of authentication information AI in accordance with FIG. 1 by way of the sensor nodes 3b and 3c and also by way of the wireless interface 4a to the base device 4 which analyzes the piece of authentication information AI. To this end, a cryptographic checksum (message authentication code, digital signature) contained in the piece of authentication information AI can be checked, for example. The cryptographic checksum can be calculated by the wireless authentication device 1 using a stored cryptographic key. If the piece of authentication information AI is valid, a join key JK (access key) is generated by the base device 4 and finally returned to the wireless communication device 2 by way of the respective sensor nodes 3a, 3b, 3c, 3d. The wireless communication device 2 is now registered at the base device 4 and now has access to the network 5 of the base device 4.

FIG. 2 shows a transfer method in accordance with the first example embodiment.

Figure 2A:
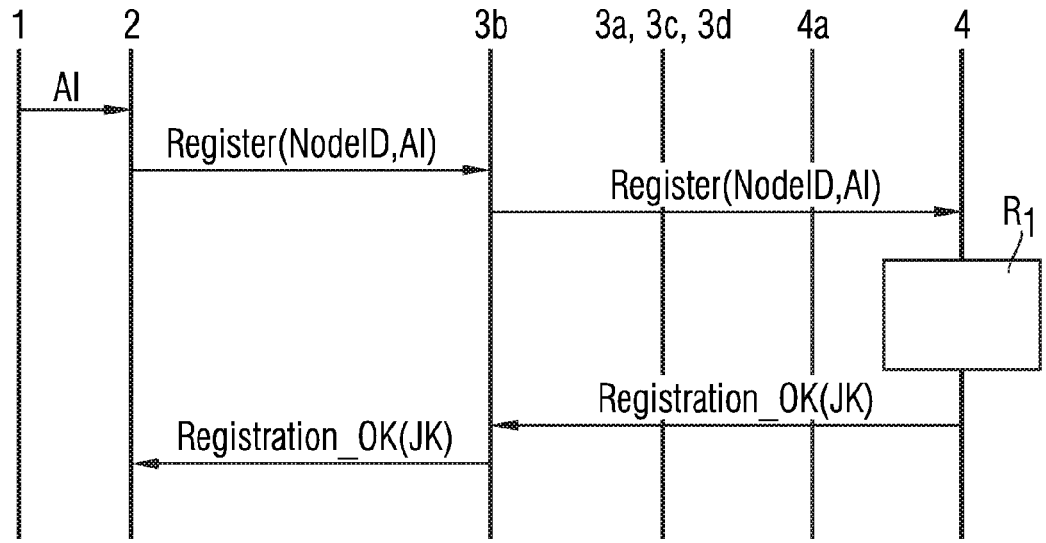
FIG. 2a shows a transfer method in accordance with the first example embodiment.

FIG. 2a shows in detail the transfer of the information to the individual units in chronological sequence. The wireless authentication device 1 sends a piece of authentication information AI to the wireless communication device 2 to be registered. The wireless communication device 2 now sends the received piece of authentication information AI together with a corresponding identification number of the wireless communication device 2 to be registered to an adjacent sensor node 3b which in turn where applicable sends this piece of authentication information AI and the corresponding identification number of the wireless communication device 2 to be registered to the base device 4 by way of further adjacent sensor nodes 3a, 3c, 3d and the wireless interface 4a of the base device 4. During the registration $R_1$ the base device 4 now analyzes the received piece of authentication information AI and generates a join key JK if the analysis is successful and enters the identification number of the wireless communication device 2 to be registered in an internal table of the base device 4, in which the access-authorized sensor nodes 3a, 3b, 3c, 3d are likewise entered. The generated join key JK is then transferred by way of the wireless interface 4a, the sensor nodes 3a, 3c, 3d where applicable and the adjacent sensor node 3b of the wireless communication device 2 to the latter. The registration operation is thereby completed. In a variant, during the registration $R_1$ the base device 4 additionally enters the join key JK in the internal table of the base device 4. In a further variant, not shown, an external table of the base device 4, for example a database or a directory service, is used by the base device 4 instead of the internal table of the base device 4.

Figure 2B:
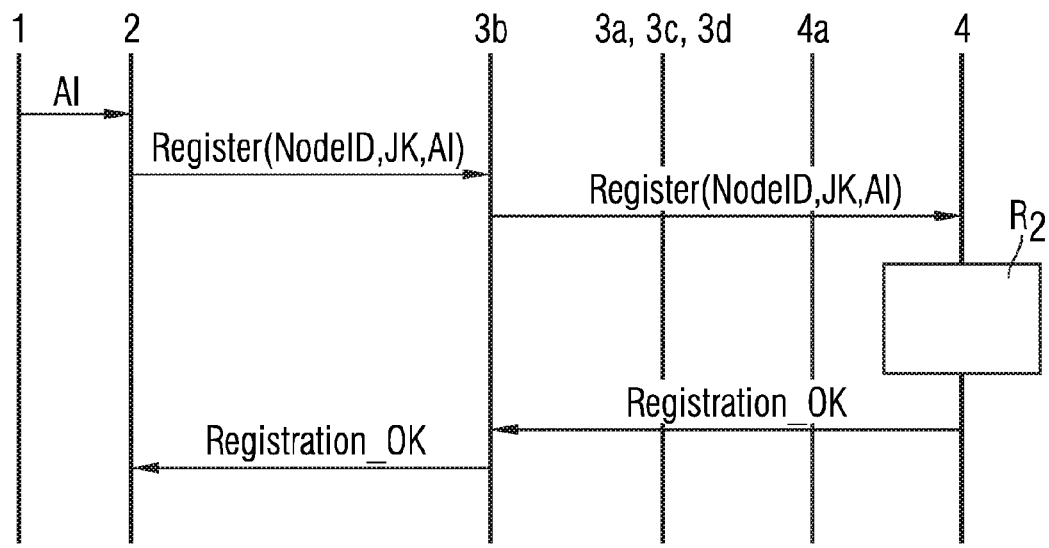
FIG. 2b shows a transfer method for a method in accordance with a second example embodiment.

In FIG. 2b, as distinguished from FIG. 2a, a join key JK which is either preconfigured or is self generated is transferred additionally from the wireless communication device 2 by way of the adjacent sensor node 3b where applicable by way of further sensor nodes 3a, 3c, 3d and by way of the wireless interface 4a of the base device 4 together with the piece of authentication information AI and an identification number to the base device 4. The registration $R_2$ at the base device 4 now takes place as follows: The base device 4 checks the received piece of authentication information AI and in the event of a positive analysis enters the identification number and the join key JK in a table for access-authorized sensor nodes. Finally, the base station 4 sends an appropriate signal indicating that registration was successful by way of the wireless interface 4a and sensor nodes 3a, 3b, 3c, 3d to the wireless communication device 2.

Figure 3:
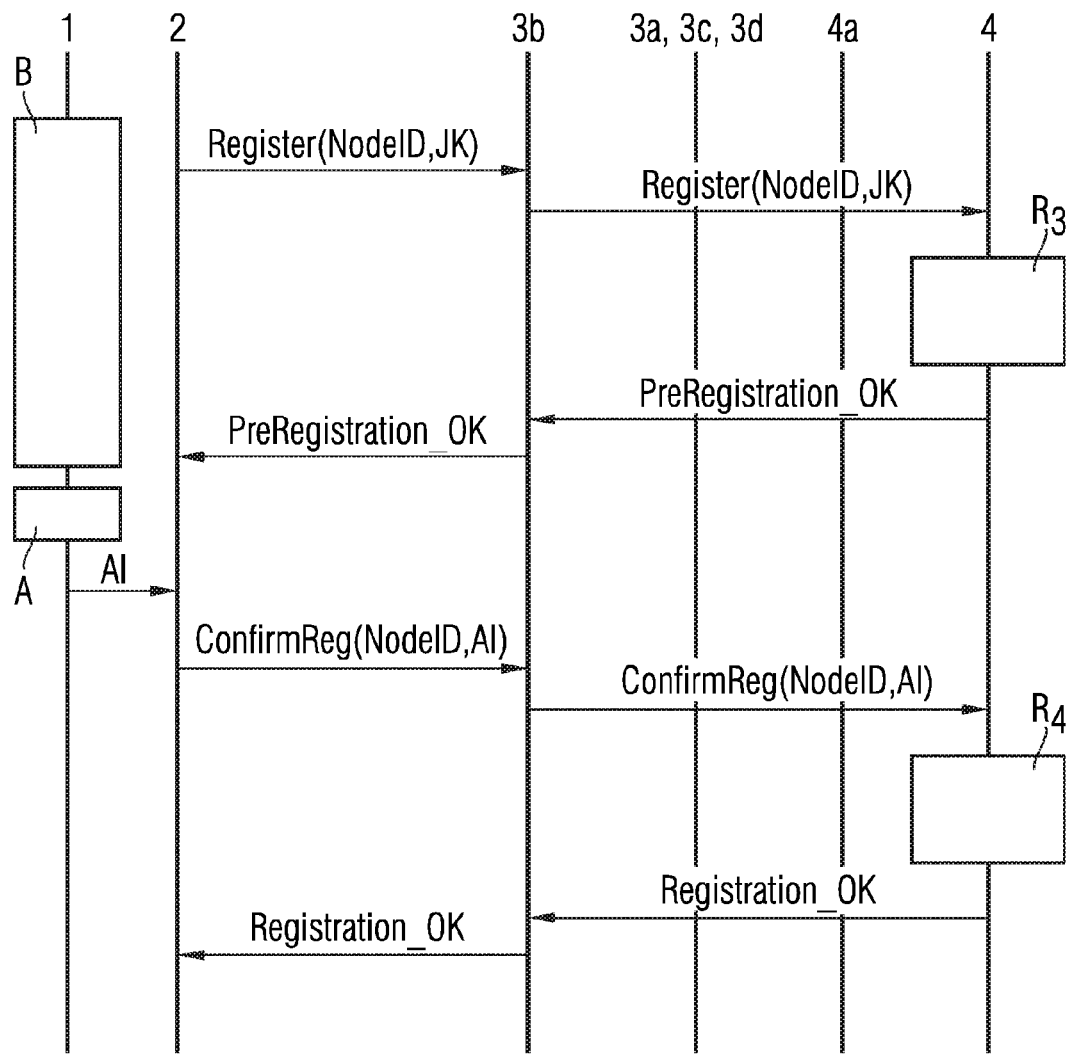
FIG. 3 shows a transfer diagram for a method in accordance with a third example embodiment.

FIG. 3 shows a transfer diagram for a method in accordance with a second example embodiment. In FIG. 3 the wireless authentication device 1 carries out an observation B of a pre-login procedure of a wireless communication device 2. The latter conveys its identification number and a join key JK by way of the adjacent sensor node 3b and where applicable further sensor nodes 3a, 3c, 3d, by way of the wireless interface 4a to the base device 4. A storage $R_3$ of the identification number and of the join key JK is performed by the base device 4. The base device 4 also returns a pre-login signal, containing the information that the pre-registration was successful, to the wireless communication device 2. This pre-login procedure is observed (observation B) and analyzed by the wireless authentication device 1. Depending on the result of the analysis, a decision is then taken as to whether a piece of authentication information AI is conveyed to the wireless communication device 2. In the case of a positive result of the analysis A, a piece of authentication information AI is conveyed to the wireless communication device 2. The latter in turn conveys the received piece of authentication information and the identification number of the wireless communication device 2 by way of the sensor nodes 3b, 3a, 3c, 3d and the wireless interface 4a to the base device 4. At the base device 4 a registration $R_4$ takes place wherein the piece of authentication information AI is checked and in the case of a positive check result the identification number of the wireless communication device 2 and the join key JK are entered in a corresponding join table in accordance with the description for the preceding figures. Furthermore, the base device 4 returns appropriate information to the wireless communication device 2 to the effect that a registration of the wireless communication device 2 at the base device 4 was successful.

Although aspects of the present invention have been described by means of the aforementioned exemplary embodiments, it is not restricted thereto but may be modified in various ways.

It is for example possible to transfer the piece of authentication information as a broadcast. In this manner, all the wireless communication devices which are located in the vicinity are able to receive this piece of authentication information. It is moreover possible to transfer the piece of authentication information to a particular wireless communication device as a unicast, for example after an authentication with an equipment certificate of a sensor node or more generally of a wireless communication device. In this situation, further node-related measurements of the transfer properties can take place, for example the signal strength thereof can be compared with a predefined value or distance measurement can be used to analyze a distance between the wireless authentication device and the wireless communication device. The piece of authentication information AI can for example comprise a password, a temporally changing random sequence in the case of a time stamp with a cryptographic checksum (message authentication code MAC or digital signature). Furthermore, the authorization information provided by the wireless authentication device can comprise a plurality of partial information items. It is for example possible that only one partial information item is transferred from the wireless communication device to the base device. It is for example possible that the wireless authorization device for example provides a tuple comprising a piece of confirmation information or assertion (for example a SAML assertion) and a key. The wireless communication device then transfers the assertion to the base device and verifies the cognizance of the key but without transferring it to the base device. This can for example take place in such a manner that the base device transfers a random number into the wireless communication device. The wireless communication device then performs a calculation, in which the random number and the key are included as parameters, for example an HMAC-SHA1 (key, random number) and returns the result to the base device which then in turn analyzes whether on the basis of the result the wireless communication device should be given access to the network of the base device.

Wireless communication by the wireless communication unit can take place for example by using WLAN or Bluetooth.

What is claimed is:
1. A method for registering a wireless communication device at a base device, comprising:
   a wireless authentication device monitoring at least one communication signal from at least one of the wireless communication device or another wireless communication device located within wireless range of the authentication device,
   generating a piece of authentication information including the at least one monitored communication signal and transmitting a piece of authentication information for reception by the wireless communication device,
   transmitting the wireless authentication device the piece of authentication information using at least one of a reduced transmitting power and a reduced directionally, such that the piece of authentication information is receivable by the wireless communication device in a spatially restricted manner, the base device receiving the piece of authentication information from the wireless communication device and analyzing the received piece of authentication information, and including the wireless communication device in a network based on the result of the analysis.

2. The method of claim 1, wherein the wireless communication device receives the transmitted piece of authentication information via in-band communication.

3. A system for registering a wireless communication device, comprising:
a wireless authentication device configured to:
monitor at least one communication signal from at least one of the wireless communication device and a wireless communication device located within wireless range of the authentication device, and
generate a piece of authentication information including the at least one monitored communication signal, and
transmit a piece of authentication information to the wireless communication device using at least one of a reduced transmitting power and a reduced directionally, such that the piece of authentication information is receivable by the wireless communication device in a spatially restricted manner, and
a base device configured to:
receive the piece of authentication information from the wireless communication device,
analyze the piece of authentication information received from the wireless communication device, and
determine whether to include the wireless communication device in a network based on a result of the analysis of the piece of authentication information.

4. The system of claim 3, wherein the wireless authentication device is further configured to observe at least one of a wireless environment and a localization of the wireless authentication device.

5. The system of claim 3, wherein the wireless authentication device is further configured to adjust a transmitting power.

6. The system of claim 3, wherein the wireless authentication device is configured to perform an analysis of at least one parameter of a wireless environment prior to transmitting the piece of authentication information.

7. The system of claim 3, wherein further comprising the wireless communication receiving the transmitted piece of authentication information via in-band communication.

8. A method for registering a wireless communication device at a base device, comprising:
sending from the wireless communication device a communication signal comprising the communication device's identification and a join key to the base device;
analyzing the communication signal and sending a result from the base device to a wireless authentication device;
a wireless authentication device transmitting a piece of authentication information after monitoring the communication signal from the wireless communication device and receiving the result from the base device, wherein the wireless communication device is located within wireless range of the authentication device;
the wireless communication device receiving the transmitted piece of authentication information;
the wireless communication device transferring the received piece of authentication information to the base device;
the base device analyzing the transmitted piece of authentication information; and
including the wireless communication device in a network based on a result of analyzing of the transmitted piece of authentication information.

9. A method for registering a wireless communication device at a base device, comprising:
(a) a wireless authentication device transmitting a piece of authentication information after monitoring at least one communication signal from at least one of the wireless communication device or another wireless communication device located within wireless range of the authentication device,
the wireless authentication device transmitting the piece of authentication information using at least one of a reduced transmitting power and a reduced directionally, such that the piece of authentication information can be received only in spatially restricted fashion,
(b) the wireless communication device receiving the transmitted piece of authentication information via in-band communication,
(c) the wireless communication device transferring the received piece of authentication information to the base device,
(d) the base device analyzing the transmitted piece of authentication information, and
(e) including the wireless communication device in a network based on the result of the analysis.

10. The method of claim 9, comprising coding the monitored communication signals into the piece of authentication information, and wherein the coded monitored communication signals are evaluated by the base device.

11. The method of claim 9, comprising performing an analysis of at least one parameter of a wireless environment prior to the authentication device transmitting the piece of authentication information.

12. The method of claim 9, comprising performing a localization of the wireless authentication device prior to the authentication device transmitting the piece of authentication information.

13. A system for registering a wireless communication device, the system comprising:
a wireless authentication device configured to transmit a piece of authentication information after monitoring communication signals from at least one of the wireless communication device or another wireless communication device located within wireless range of the authentication device,
the wireless authentication device configured to transmit the piece of authentication information using at least one of a reduced transmitting power and a reduced directionally, such that the piece of authentication information can be received only in spatially restricted fashion,
the wireless communication device is configured to:
receive the transmitted piece of authentication information, and
send the piece of authentication information to a base device, and the base device is configured to:
receive the piece of authentication information from the wireless communication device,
analyze the received piece of authentication information, and
determine whether to include the wireless communication device in a network based on a result of the analysis of the piece of authentication information.

14. The system of claim 13, wherein the wireless authentication device is further configured to observe at least one of a wireless environment and a localization of the wireless authentication device.

15. The system of claim 13, wherein the wireless authentication device is further configured to adjust a transmitting power.

16. The system of claim 13, wherein the wireless authentication device is configured to perform an analysis of at least one parameter of a wireless environment prior to transmitting the piece of authentication information.

17. The system of claim 13, wherein the wireless communication device is configured to receive the transmitted piece of authentication information via in-band communication.

18. The system of claim 13, wherein the wireless authentication device is configured to code the monitored communication signal into the piece of authentication information, and wherein the base device is configured to evaluate the coded monitored communication signals.

19. The system of claim 13, comprising performing a localization of the wireless authentication device prior to the authentication device transmitting the piece of authentication information.

* * * * *